(12) United States Patent
Mark (10) Patent No.: US 6,984,313 B2
(45) Date of Patent: Jan. 10, 2006

(54) FILTRATION AND PURIFICATION SYSTEM AND METHOD THEREFOR

(76) Inventor: Farvell M. Mark, 4215 W. Jan Juan Ave., Phoenix, AZ (US) 85019

( * ) Notice: Subject to any disclaimer, the term of this patent is extended or adjusted under 35 U.S.C. 154(b) by 0 days.

(21) Appl. No.: 10/717,682

(22) Filed: Feb. 8, 2005

(65) Prior Publication Data

US 2005/0178708 A1     Aug. 18, 2005

Related U.S. Application Data

(63) Continuation-in-part of application No. 10/082,632, filed on Feb. 22, 2002, now abandoned.

(60) Provisional application No. 60/279,464, filed on Mar. 26, 2001.

(51) Int. Cl.
    *C02F 9/12*     (2006.01)

(52) U.S. Cl. .................. 210/106; 210/138; 210/313; 210/332; 210/335

(58) Field of Classification Search ............... 210/106, 210/138, 332, 422, 433.1, 409, 313, 333.1, 210/130, 132, 335
    See application file for complete search history.

(56) References Cited

U.S. PATENT DOCUMENTS

| 6,241,878 B1 * | 6/2001 | Snaper ..................... 210/99 |
| 6,423,223 B1 * | 7/2002 | Northcut et al. ........... 210/232 |
| 2002/0144952 A1 * | 10/2002 | Saxton ..................... 210/739 |

FOREIGN PATENT DOCUMENTS

JP          10066971 A    *   3/1998

* cited by examiner

*Primary Examiner*—Terry K. Cecil
(74) *Attorney, Agent, or Firm*—Jeffrey D. Moy; Harry M. Weiss; Weiss, Moy & Harris, P.C.

(57) ABSTRACT

An automatic water filtration and purification system will allow a continuous water flow to downstream fixtures while simultaneously and automatically regularly flushing and cleaning in-path filter media. The automatic water filtration and purification system has at least one filter to remove impurities from a water in-path through-put. A cleaner is coupled to the at least one filter to clean the at least one filter. A controller is coupled to the at least one filter to regulate automatic operation of the cleaner wherein continuous operation of water flow to fixtures downstream of the at least one filter is essentially uninterrupted during the operation of the cleaner and the controller.

3 Claims, 7 Drawing Sheets

FILTRATION AND PURIFICATION SYSTEM AND METHOD THEREFOR

RELATED APPLICATIONS

This patent application is claiming the benefit of the U.S. Provisional Application having an application No. of 60/279,464, filed Mar. 26, 2001, in the name of Farvell M. Mark, and entitled "FILTRATION AND PURIFICATION SYSTEM". This application is a continuation-in-part and also related to U.S. patent application entitled "Filtration and Purification System and Method Therefor," having a Ser. No. 10/082,632, filed Feb. 22, 2002, now abandoned also in the name of Farvell M. Mark.

BACKGROUND OF THE INVENTION

1. Field of the Invention

This invention relates water filters and, more specifically, to an improved water filtering and purification system that will extend or maximize the lifetime of the filter media, will reduce the difficulties attendant to replacing the filter media, and maintain water flow through the system at all times, particularly while renewing the filter media, or replacing the filter media.

2. Description of the Prior Art

Filtered and purified water is desired and needed by many people. These people spends enormous amounts of money to purchase this type of water. The reasons for such desires and needs include: filtered and purified water is perceived by many to have a superior taste or flavor; filtered and purified water eliminates minerals that are carried from sources, such as tap water, thus reducing mineral deposits, scaling, etc.; and, filtered and purified water removes undesirable contaminants, such as: organics, pesticides, chemicals, cysts, and protozoa, thus minimizing waterborne sickness and disease, etc. Most modern water filtering and purifying systems comprise mechanical filtration in combination with some form of purification, e.g., chlorine-type additives, ultraviolet exposure, ozonation, etc. Such systems, however, require frequent maintenance. For example, the mechanical filtration components require that the filters be replaced after a certain number of through-put or hours of usage. The time interval for such filter replacement, although variable, is typically on the order of three months of usage for the replacement of each filter. Three months is a relatively short time frame that requires either (1) an expensive visit from a maintenance technician or (2) that the owner of the water filtering and purifying system have the new filters on hand and remembers to change the filters when due.

Also, an additional hardship attendant to the replacement of a filter includes the physical difficulty with removing a tall housing and filter assembly that is filled with water and located with contaminants. Consequently, many users of such systems fail to follow through with the required action of replacing the filters. The failure to replace the filters when required leads to (1) the overloading of the filter media, which results in the filter media possibly clogging, and thus, having a reduced water flow, or (2) the filter media allowing contaminants to begin passing through the system. Furthermore, it is generally true that when performing such filter replacements, the filter system must have the water flow shut off. Therefore, when renewing or replacing the filters, the facility being served by the system is deprived of water flow for the duration of the filter renewal/replacement procedure.

Therefore, a need exists for a filtration and purification system that will extend or maximize the lifetime of the filter media. Another need exists for a filtration and purification system that will automatically extend or maximize the lifetime of the filter media. A further needs exists for a filtration and purification system that will reduce the difficulties attendant to replacing the filter media. Yet another need exists for a filtration and purification system that will maintain water flow through the system at all times, particularly while renewing the filter media, or replacing the filter media.

SUMMARY OF THE INVENTION

In accordance with one embodiment of the present invention, it is an object of the present invention to provide a filtration and purification system that will extend or maximize the lifetime of the filter media.

It is another object of the present invention to provide a filtration and purification system that will automatically extend or maximize the lifetime of the filter media.

It is still another object of the present invention to provide a filtration and purification system that will reduce the difficulties attendant to replacing the filter media.

It is yet another object of the present invention to provide a filtration and purification system that will maintain water flow through the system at all times, particularly while renewing the filter media, or replacing the filter media.

BRIEF DESCRIPTION OF THE EMBODIMENTS

In accordance with one embodiment of the present invention an automatic water filtration and purification system for light industrial and home installations is disclosed. The automatic water filtration and purification system will allow a continuous water flow to downstream fixtures while simultaneously and automatically regularly flushing and cleaning in-path filter media. The automatic water filtration and purification system has at least one filter to remove impurities from a water in-path through-put. A cleaner is coupled to the at least one filter to clean the at least one filter. A controller is coupled to the at least one filter to regulate automatic operation of the cleaner wherein continuous operation of water flow to fixtures downstream of the at least one filter is essentially uninterrupted during the operation of the cleaner and the controller.

In accordance with another embodiment of the present invention an automatic water filtration and purification system for light industrial and home installations is disclosed. The automatic water filtration and purification system provides continuous water flow to downstream fixtures while simultaneously and automatically regularly flushing and cleaning in-path filter media. The automatic water filtration and purification system has at least one filter assembly having at least one flushing port. An ultraviolet lamp assembly is coupled in series with the at least one filter assembly. A flushing control valve is coupled to the at least one flushing port of the at least one filter assembly. A programmable control unit is connected to the flushing control valve.

In accordance with another embodiment of the present invention an automatic water filtration and purification system for light industrial and home installations is disclosed. The water filtration and purification system will have a continuous water flow to a fixture coupled thereto, while simultaneously and automatically regularly flushing and cleaning in-path filter media. The water filtration and purification system has a bypass valve coupled to a water line for diverting water to the fixture without passing through the automatic water filtration and purification system. A course filter assembly is coupled to the bypass valve. A fine filter assembly is coupled in series to the course filter assembly. An ultraviolet lamp assembly is coupled in series with the at fine filter assembly. A flushing control valve is coupled to the flushing ports of the course and fine filter assemblies. A programmable control unit is connected to the flushing control valve. The programmable control unit comprises a sequentially energized flushing control valve timer electrically connected to the flushing control valves for automatically and regularly flushing and cleaning the automatic water filtration and purification system.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DETAILED DESCRIPTION OF THE PREFERRED EMBODIMENT

The filtration and purification system of the present invention has many uses that those skilled in the art will recognize. A particular and preferred application of preferred embodiments of the present invention is for the filtration of all personal washing or potentially consumable water in a light industrial-type building. Such buildings may comprise, for example, homes, small-medium office buildings, restaurants, and in a preferred installation of embodiments of the present invention, dentist offices. Such locations cannot benefit economically, or in terms of usage, from large-scale industrial installations. Dentist offices are well-suited for installation and use of preferred embodiments of the present invention due to the water usage, particularly during dental procedures that use large amounts of water for mouth rinsing and the like. Those skilled in the art will recognize, however, that in appropriate circumstances, preferred embodiments of the present invention may be installed in many different applications or buildings.

Figure 1:
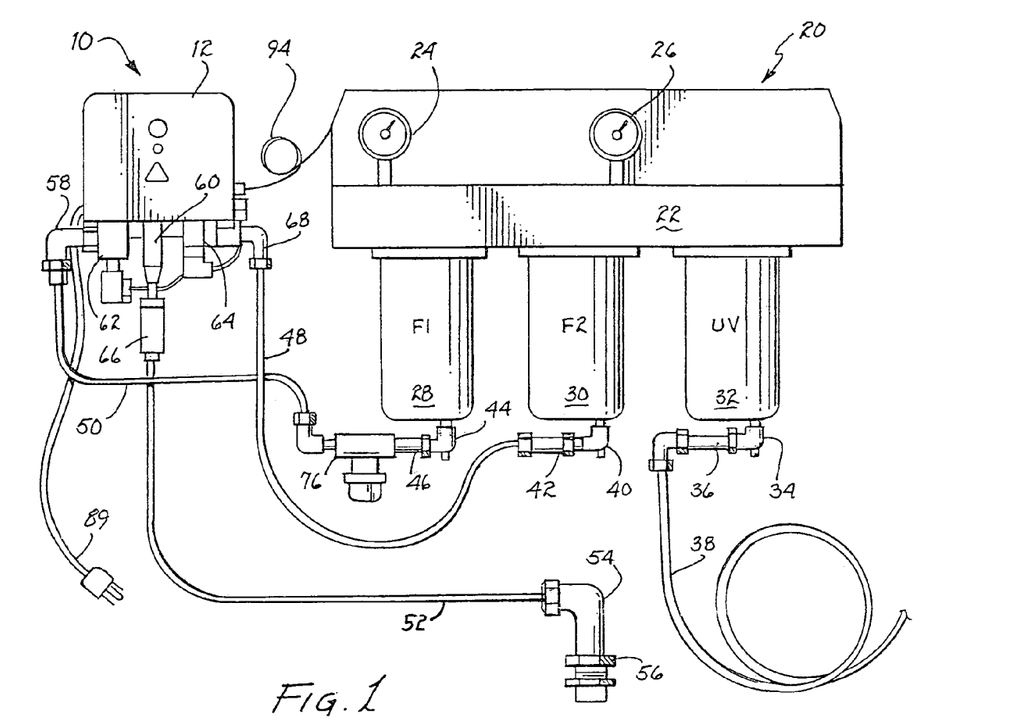
FIG. 1 is an elevated perspective view of one embodiment of the filtration and purification system of the present invention.

Referring to FIG. 1, an elevated perspective view of one embodiment of the filtration and purification system 10 of the present invention is shown. The filtration and purification system 10 preferably comprises a filter and purification assembly 20. The filter and purification assembly 20 is designed for facilities having a filtered and purified water through-put requirement that is preferably about 15 gallons per minute. However, this should not be seen as to limit the scope of the present invention. Facilities having a through-put requirement of less than 15 gallons per minute may still benefit from using the filtration and purification system 10.

The filter and purification assembly 20 comprises a filter head 22 to which is preferably connected at least one coarse filter assembly 28. The filter head 22 further preferably comprises at least one fine filter assembly 30 connected to the filter head 22. The filter head 22 further preferably comprises a purification assembly 32 connected to the filter head 22. The coarse and fine filter assemblies 28 and 30 and the purification assembly 32 are mechanically coupled such that a flow of incoming water passes through the assemblies in a series flow, as will be well understood by those skilled in the art. The filter and purification assembly 20 is of a type generally commercially available in a basic form.

The coarse filter assembly 28 may comprise different types of filter media. In accordance with one embodiment of the present invention, the coarse filter assembly 28 comprises a replaceable ten-micron filter media preferably having activated charcoal. The coarse filter assembly 28 filters out the larger, coarser particles and contaminants suspended in the water flowing through the system 10. The effluent from the coarse filter assembly 28 is coupled through the fine filter assembly 30. The fine filter assembly 30 may also be comprised of different types of filter media. In accordance with one embodiment of the present invention, the fine filter assembly comprises a replaceable 0.5-micron filter media preferably having activated charcoal. The effluent from the fine filter assembly 30 is coupled through the purification assembly 32. The purification assembly 32 may also be comprised of different types of filtering media. In accordance with one embodiment of the present invention, the purification assembly 32 comprises an internal high energy 25-watt ultraviolet lamp. In general, the high energy 25-watt ultraviolet lamp should have an output of approximately 60,000 Micro watts/square-centimeter (at EOL), and an approximate lifetime of 9,000 hours. Such filter media and ultraviolet lamps are of types generally commercially available.

The filter head 22 further comprises respective pressure gauges 24 and 26 connected respectively to the water inlet upstream of the coarse filter assembly 28 and to the water outlet downstream of the purification assembly 30. The pressure gauges 24 and 26 comprise low-pressure gauges having a range of approximately 0–100 inches $H_2O$. The pressure gauges 24 and 26 may be used to monitor the performance of the system 20, as those skilled in the art will understand.

The system 10 further comprises valving and disconnect assemblies connected to the base of each of the filter and purification assemblies 28, 30, and 32. These important features, in preferred embodiments of the present invention, comprise drain valves 44, 40 and 34 connected to the base of each filter and purification assembly 28, 30 and 32. Each drain valve 44, 40 and 34 further preferably comprises quick disconnect couplings 46, 42 and 36, respectively. The system 10 further comprises a valve filter assembly 76 connected downstream of the quick disconnect coupling 46. The system 10 further comprises water line 50, fitting 58 and solenoid valve 62. The discharge of the valve filter assembly 76 is coupled via water line 50 to solenoid valve 62, via fitting 58. The system 10 further comprises a timer and control unit 12, and solenoid valve 62 is preferably mechanically attached to the timer and control unit 12. The system 10 further comprises water line 48, fitting 68 and solenoid valve 64. The discharge of the quick disconnect coupling 42 is coupled via water line 48 to solenoid valve 64, via fitting 68.

The system 10 further preferably comprises a T-fitting 60, a check valve 66, and water drain line 52. The T-fitting 60 couples the water discharge from the two solenoid valves 62 and 64 together, down through the check valve 66, and down through the water drain line 52. The water drain line 52 is then coupled via a drain adapter 54 to a drain 56. Those skilled in the art will recognize that, in appropriate circumstances, the drain connection might utilize drain stand pipes, etc., as might be dictated by code requirements, engineering needs, etc. The system 10 further comprises a drain line 38 coupled to the quick disconnect 36, that is coupled to the drain valve 34. The timer and control unit 12 of the system 10 comprises the timing and control circuitry that controls the solenoid valves 62 and 64 and the ultraviolet lamp within the purification assembly 32. The timer and control unit 12 is electrically coupled to the ultraviolet lamp within the purification assembly 32 via cable 94.

Figure 2:
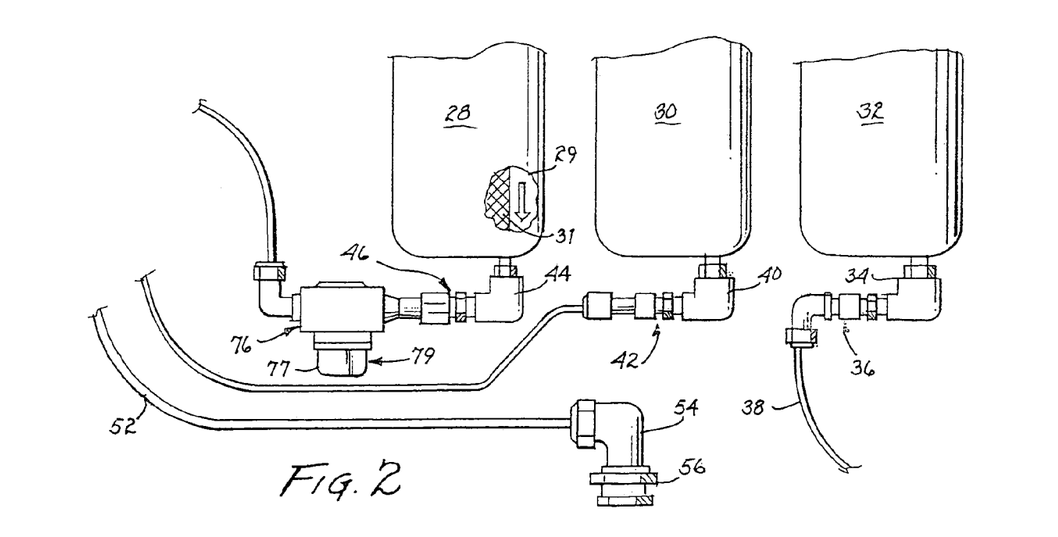
FIG. 2 is an enlarged view of one embodiment of the valving and coupling arrangement of the filtration and purification system shown in FIG. 1.

Referring to FIG. 2, an enlarged view of the valving and coupling arrangement of the filtration and purification system of FIG. 1 is shown. As shown, each respective drain valve 44, 40 and 34 is coupled to and through the bottom of the respective housing of the coarse and fine filter assemblies 28 and 30 and the purification assembly 32. A cut-away view 29 in the bottom of the coarse filter assembly 28 shows that the drain valve 44 penetration is located such that its opening is in the outer, effluent, portion or section of the coarse filter assembly 28. A portion of the coarse filter media 31 is shown located in the center portion of the coarse filter assembly 28. The valve filter assembly 76, also shown in greater detail, comprises a clear, removable cap 77, in which is housed a filter element 79. The filter element 79 filters the effluent of the coarse filter assembly 28 of particles that may damage the valve seat of the solenoid valve 62 (see FIG. 1).

Figure 3:
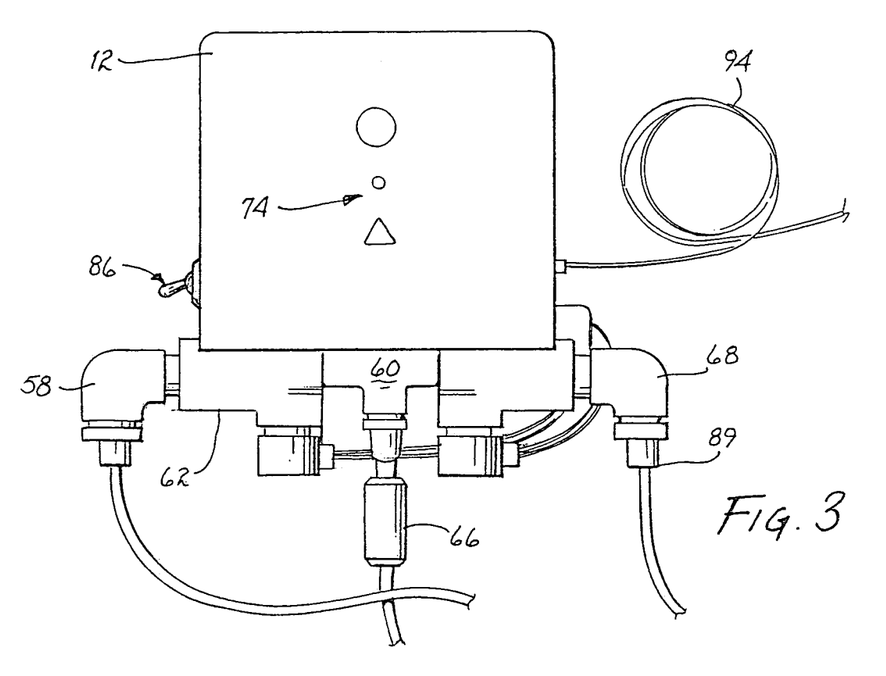
FIG. 3 is an enlarged view of one embodiment of the timer and control unit of the filtration and purification system in FIG. 1.

Referring to FIG. 3, an enlarged view of one embodiment of the timer and control unit 12 of the filtration and purification system of FIG. 1 is shown. The timer and control unit 12, in addition to the previously-mentioned items, further comprises a power switch 86 and an ultraviolet lamp operation indicator 74. The timer and control unit 12 may be opened to access the internal components.

Figure 4:
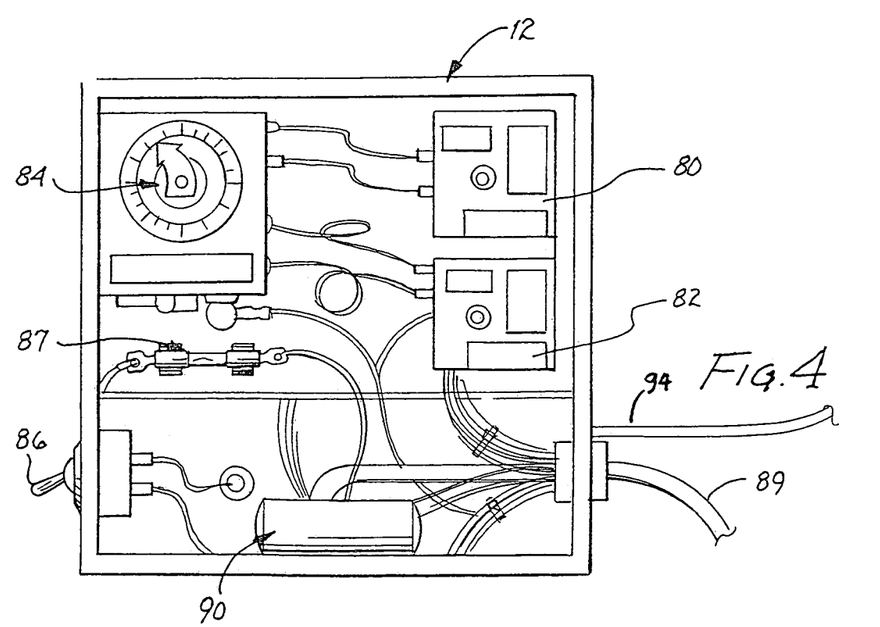
FIG. 4 is an interior view of one embodiment of the timer and control unit of the filtration and purification system shown in FIGS. 1 and 3.

Referring to FIG. 4, an interior view of one embodiment of the timer and control unit 12 of the filtration and purification system of FIGS. 1 and 3 is shown. The timer and control unit 12 comprises the main power switch 86, a fuse 87, the main power supply cord 89, a 24-hour programmable timer 84, two valve timers 80 and 82, and a ultraviolet power ballast B1. Although the above components are preferred, those skilled in the art will recognize that in appropriate circumstances, other or additional electrical components might be used.

Figure 5:
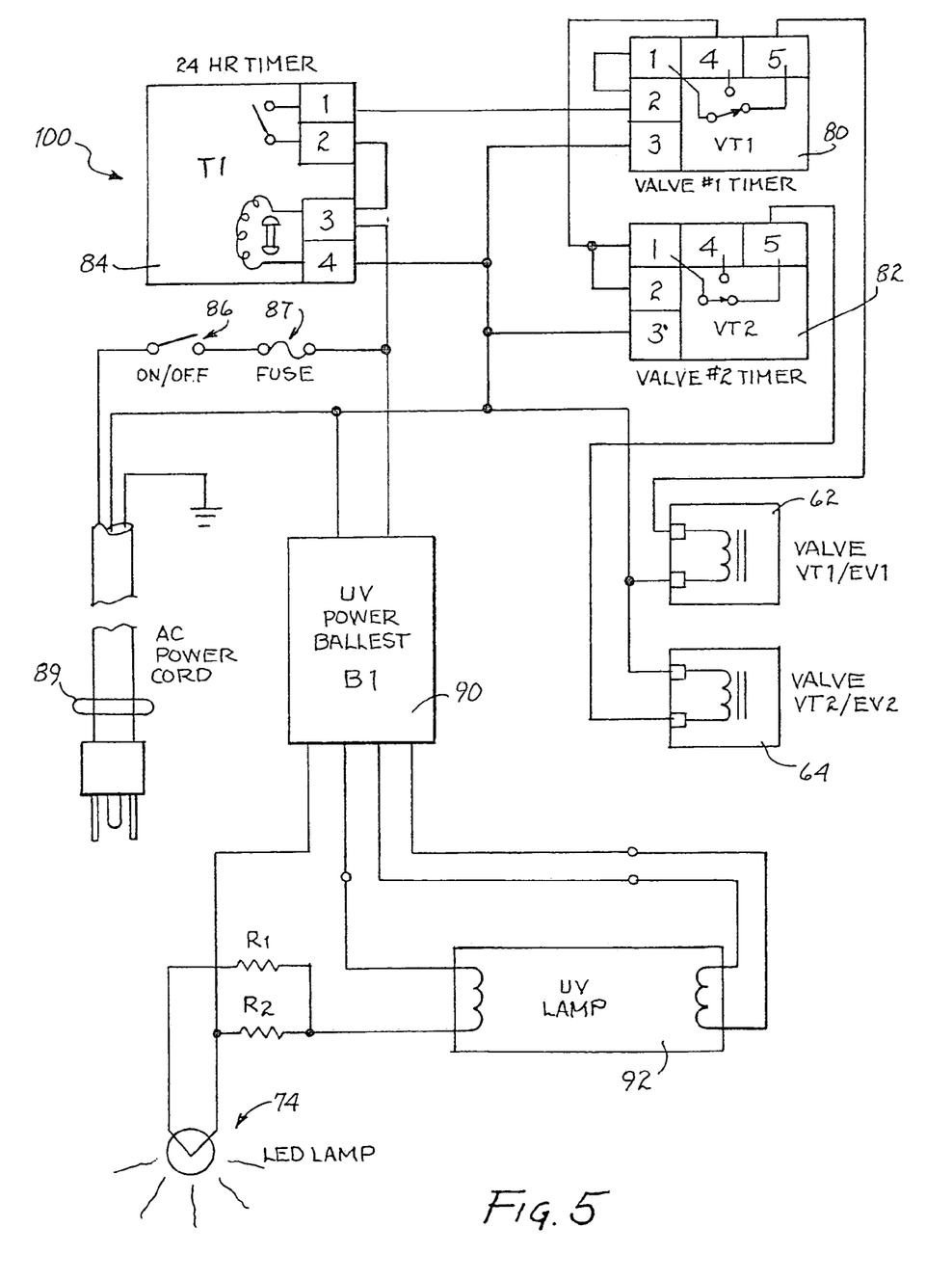
FIG. 5 is an electrical schematic diagram of one embodiment of the timer and control system utilized in a preferred embodiment of the filtration and purification system of the present invention.

Referring to FIG. 5, an electrical schematic of one embodiment of the timer and control system 100 utilized in the filtration and purification system 10 of the present invention is shown. The timer and control system 100 comprises, as previously mentioned, an electrical power cord and plug assembly 89, an on/off switch 86, a fuse 87, a 24-hour programmable timer 84, two valve timers 80 and 82, two solenoid valves 62 and 64, an ultraviolet power ballast 90, an ultraviolet lamp operation indicator 74, and an internal high energy ultraviolet lamp 92. The timer and control system 100 individual components are of such types as are generally commercially available as known by those skilled in the art.

Figure 6:
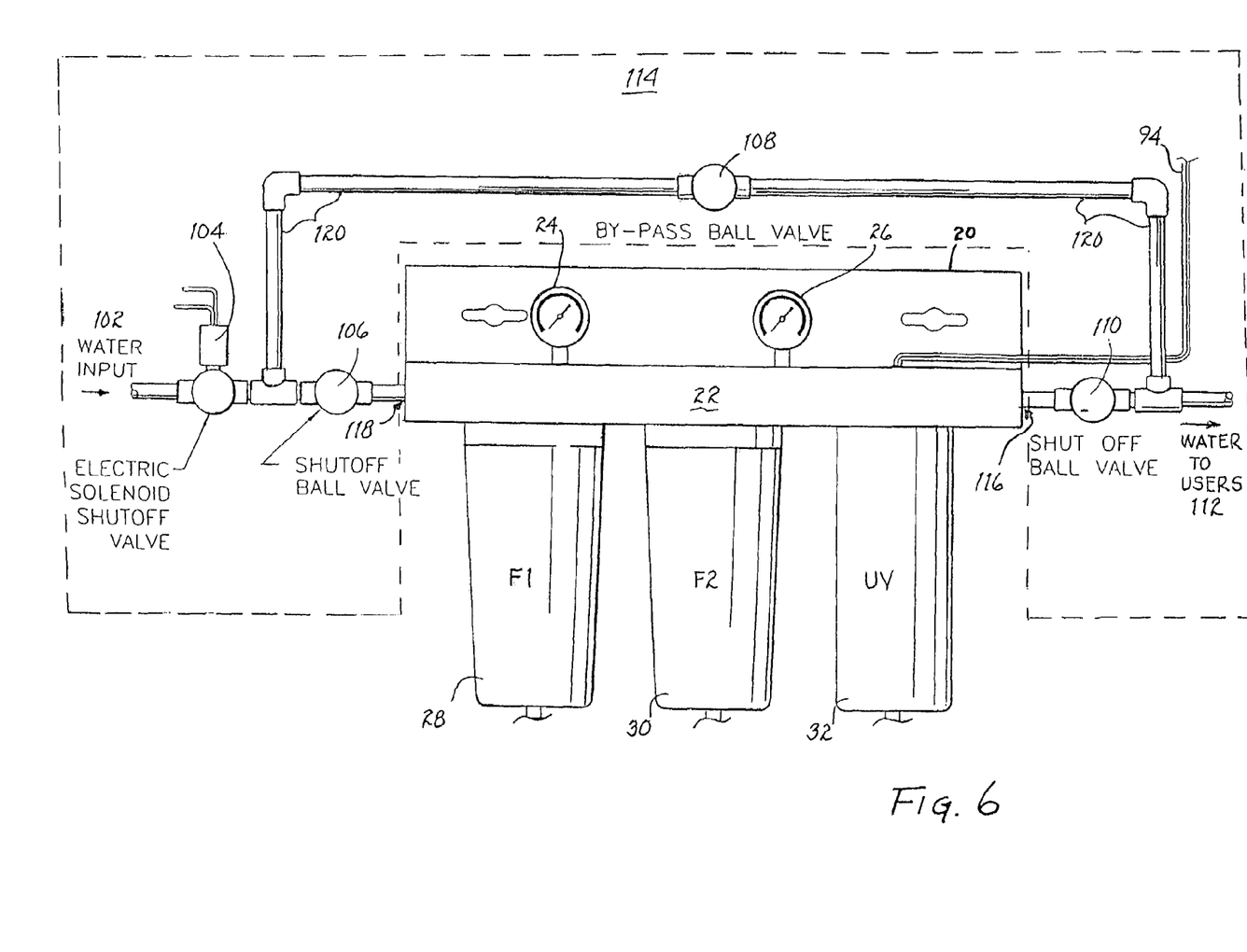
FIG. 6 is a functional block diagram of one method of the mechanical installation of one embodiment of the filtration and purification system of the present invention, as shown in FIG. 1.

Referring to FIG. 6, a functional block diagram of one method of the mechanical installation of one embodiment of the filtration and purification system 10 of the present invention of is shown. The filter head 22, as previously discussed, comprises the coarse and file filter assemblies 28 and 30, the purification assembly 32, and the pressure gauges 24 and 26. The filter head 22 further comprises a water inlet 118 and a water outlet 116. Coupled to the water inlet 118 and the water outlet 116 is the supply and bypass piping system 114. The supply and bypass piping system 114 comprises an electric solenoid valve 104 connected to a main water input 102. The main water input 102 is the building or facility main water input or supply. The electric solenoid valve 104 provides a means to shut-off the water supply to the entire facility, as is common in dentist offices. The discharge from the electric solenoid valve 104 is connected to an inlet shut-off ball valve 106, whose discharge is connected into the water inlet 118 of the filter head 22. The water outlet 116 is connected to an outlet shut-off ball valve 110. The discharge of the outlet shut-off valve is connected to the water users 112 in the facility. The normal arrangement of the shut-off ball valves 106 and 110 allows flowthough into and out of the filter head 22. However, some situations may require the shut-off of such water flow and the isolation of the filter head 22. For such occasions, the supply and bypass piping system 114 also comprises a bypass ball valve 108 and bypass piping 120. Operation of the three ball valves 106, 110, and 108, in a fashion which will be understandable to those skilled in the art, provides for the hydraulic isolation of the filter head 22. It should be noted that, as those skilled in the art would find appropriate, multiple installations of the system 10 in series and/or parallel configurations may be done to increase through-put or to obtain a greater degree of filtration and disinfecting.

Primary objects and features of preferred embodiments of the present invention are to provide a filtration and purification system that will automatically extend or maximize the lifetime of filter media; and to provide such a filtration and purification system that will reduce the difficulties attendant to replacing the filter media. Thus, the previously-mentioned components must function together to provide such automatic functioning. The timer and control system 100, as shown in FIG. 5, provides the features of programmable automatic purging or flushing of the filter media, thereby extending the filter media-usable lifetime, potentially by as much as a factor of four in a described preferred embodiment. Thus rather than charging filter media approximately every three months, as in the prior art, approximately one year may elapse before filter media must be replaced. This filter media lifetime extension is possible due to the programmable automatic purging or flushing of the filter media, thereby removing large quantities of the debris otherwise clogging the filter media. The automatic purging or flushing of the filter media is initiated by the 24-hour programmable timer.

Referring to FIGS. 1, 4, 5 and 6, the operation of the system 10 is as follows. The bypass ball valve 108 is closed, the electric solenoid valve 104 and the inlet and outlet ball valves 106 and 110 are open. Filter media and the ultraviolet lamp have been installed within their respective coarse and fine filter assemblies 28 and 30 and the purification assembly 32. The drain valves 44 and 40 are open, and the drain valve 34 is shut. The valve filter assembly 76 has an element 79 installed within it. The 24-hour programmable timer 84 is first set to the correct time of day by turning the dial on the 24-hour programmable timer 84 clockwise until the time of day aligns with the time arrow. The 24-hour programmable timer 84 comprises a plurality of programming tabs, or pins, that may be set, in well-known ways, for the number of desired filter cycles per 24-hour period and within the desired time frame. To adjust the number of flushing cycles desired, the user should pull one (1) pin up for EACH desired flush time. The cleanliness or turbidity of the incoming water will determine the frequency of flushing required to keep the filter media cleaned properly. A preferred flushing cycle is between three (3) and six (6) flushes per day, although those skilled in the art will recognize that this may vary in appropriate circumstances. As an example, to flush three times per working day, the user would pull the 10:00 a.m. pin, the 12:00 p.m. pin, and the 2:00 p.m. pin (note that adjacent pins are not to be pulled). Thus, the flushing cycle would be automatically set for three flushes of the filter media. Depending on the available water pressure and flow rate, the flushing rate is approximately 3 gallons per minute.

With the electrical power supplied via the electrical power cord and plug assembly 89, and the on/off switch 86 energized, the UV lamp indicator 74 on the timer and control unit 12 should be illuminated. The 24-hour programmable timer 84 is now also electronically coupled to the first valve timer 80. With the system 10 correctly aligned, the water flow subject to treatment by the system 10 first enters the coarse filter assembly 28 and flows through the internal 10-micron filter media. The coarse filter assembly 28 filters out the larger coarser particles and contaminants suspended in the water flowing through the system 10. The effluent from the coarse filter assembly 28 next passes through the fine filter assembly 30 and through the internal 0.5-micron filter media. The effluent from the fine filter assembly 30 next enters the purification assembly 32, where it is purified by the ultraviolet action of the internal high energy ultraviolet lamp 92 (see FIG. 5).

The 24-hour programmable timer 84 will, at the designated times, control the start of each filter flushing cycle, and the valve timer 80 will pass current to the solenoid valve 62, which will open for a flush cycle of the coarse filter assembly 28. Water will flow from the upstream side of the coarse filter media (see cut-away view 29 showing a depiction of the coarse filter 31 and the downward purge flow). The purging water flow will pass through the valve filter assembly 76, through water line 50, through fitting 58, through solenoid valve 62, through T-fitting 60, through check valve 66, through water drain line 52, and out through the drain adapter 54 to drain 56. The valve filter assembly 76 filters out particulates that might otherwise potentially damage the valve seat of the solenoid valve 62.

The flow of water downward and outward from the coarse filter assembly 28 creates a swirling action that flushes particulates from the outer surface of the coarse filter media. This flushing feature, in embodiments of the present invention, therefore renews the filtering ability of the filter media, thereby enabling an extended and maximized lifetime of each filter media much greater than that of prior art systems. The duration of each filter media flush cycle is preferably three minutes, although those skilled in the art will recognize that this is adjustable in appropriate circumstances. To increase or decrease the duration of each filter media flush cycle, the user will turn on or off the small switches (left in ON, right if OFF) located on the valve timer 80 in ways known in the valve timer art.

Following the set filter media flush cycle of the coarse filter assembly 28 is valve timer 80. The valve timer 80 is electronically coupled to valve timer 82. The valve timer 82 will pass current to the solenoid valve 64, which will open for a flush cycle of the fine filter assembly 30. Water will flow from the upstream side of the fine filter media (substantially similar to the cut-away view 29 showing a depiction of the coarse filter 31 and the downward purge flow). The purging water flow will pass through water line 48, through fitting 68, through solenoid valve 64, through T-fitting 60, through check valve 66, through water drain line 52, and out through the drain adapter 54 to drain 56.

The flow of water downward and outward from the fine filter assembly 30 creates a swirling action that flushes particulates from the outer surface of the fine filter media. This flushing feature in embodiments of the present invention therefore renews the filtering ability of the filer media, thereby enabling an extended and maximized lifetime of each filter media much greater than that of prior art systems. The duration of each filter media flush cycle is preferably three minutes, although those skilled in the art will recognize that this is adjustable in appropriate circumstances. To increase or decrease the duration of each filter media flush cycle, the user will turn on or off the small switches (left is ON, right is OFF) located on the valve timer 82 in ways known in the valve timer art.

The filter media in the coarse and fine filter assembles 28 and 30 and the valve filter assembly 76 should nominally, in the described embodiment, provide satisfactory service for approximately one year. Those skilled in the art will recognize that the available water supply quality in different locations will dictate the appropriate adjustment of the number of and duration of the filter media flush cycles. The above-described preferred embodiment of the present invention has an object and feature of maintaining water flow through the system 10, while the flushing of the filter media renews its filtering capabilities.

When the time has come to replace the filter media within the coarse and fine filter assemblies 28 and 30, or the ultraviolet lamp within the purification assembly 32, the following features of preferred embodiments of the present invention facilitate this procedure. The user will first turn the on/off switch 86 to the off position. The user will next operate the ball valves 106, 110, and 108 such that the hydraulic isolation of the filter head 22 occurs. This operation of the ball valves 106, 110, and 108 further provides that the above-described preferred embodiment of the present invention has an object and feature of maintaining water flow though the system 10, while the replacement of the filter media or servicing of the purification assembly is taking place.

The drain valves 44 and 40 are next closed, followed by disconnecting the water lines 50 and 48 at the quick disconnect couplings 46 and 42, respectively. The drain line 38 is next coupled to the quick disconnect 46, and the drain valve 44 is opened to drain the coarse filter assembly 28 through the drain line 38 to an appropriate drain or water receiver. This feature allows the removal of the large quantity of water from the coarse filter assembly 28, resulting in a substantial reduction in the weight required to be handled during the filter media replacement procedure. Following the draining of the coarse filter assembly 28, a spanner wrench is utilized to remove the filter housing, as is well-known to those skilled in the art. This procedure is preferably then substantially repeated for the fine filter assembly media replacement and the servicing of the purification assembly 32. Thus, the drain valve and quick disconnect provide features of quickly and easily replacing filter media and servicing the purification assembly 32. Following the servicing of the system 10, the system is realigned, as previously described and as appropriate. It should be noted that the 24-hour programmable timer 84 will need to be reset to the correct time of day when placing the system 10 back in service.

Figure 7:
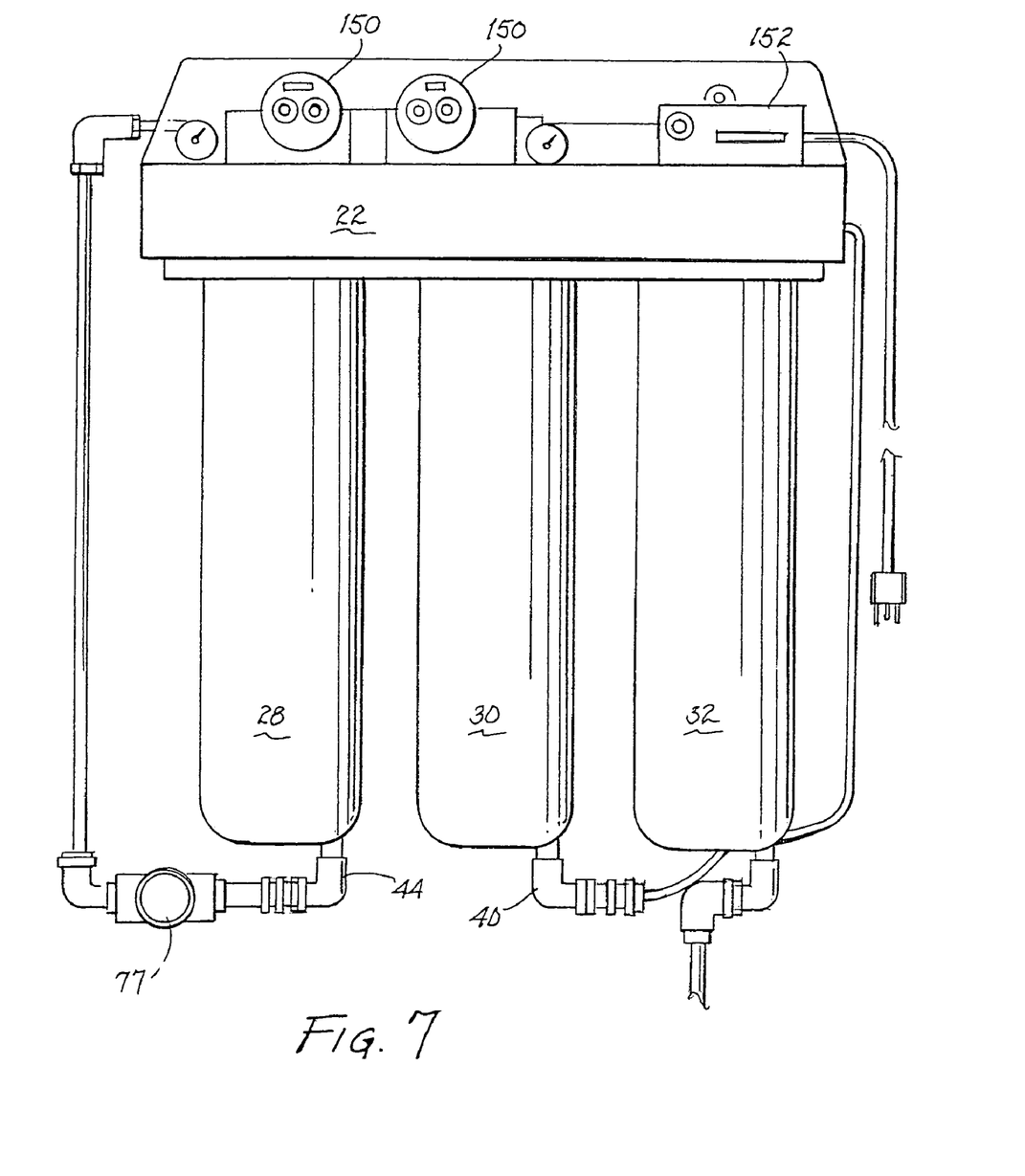
FIG. 7 is an elevated perspective view of another embodiment of the filtration and purification system of the present invention.
Figure 8:
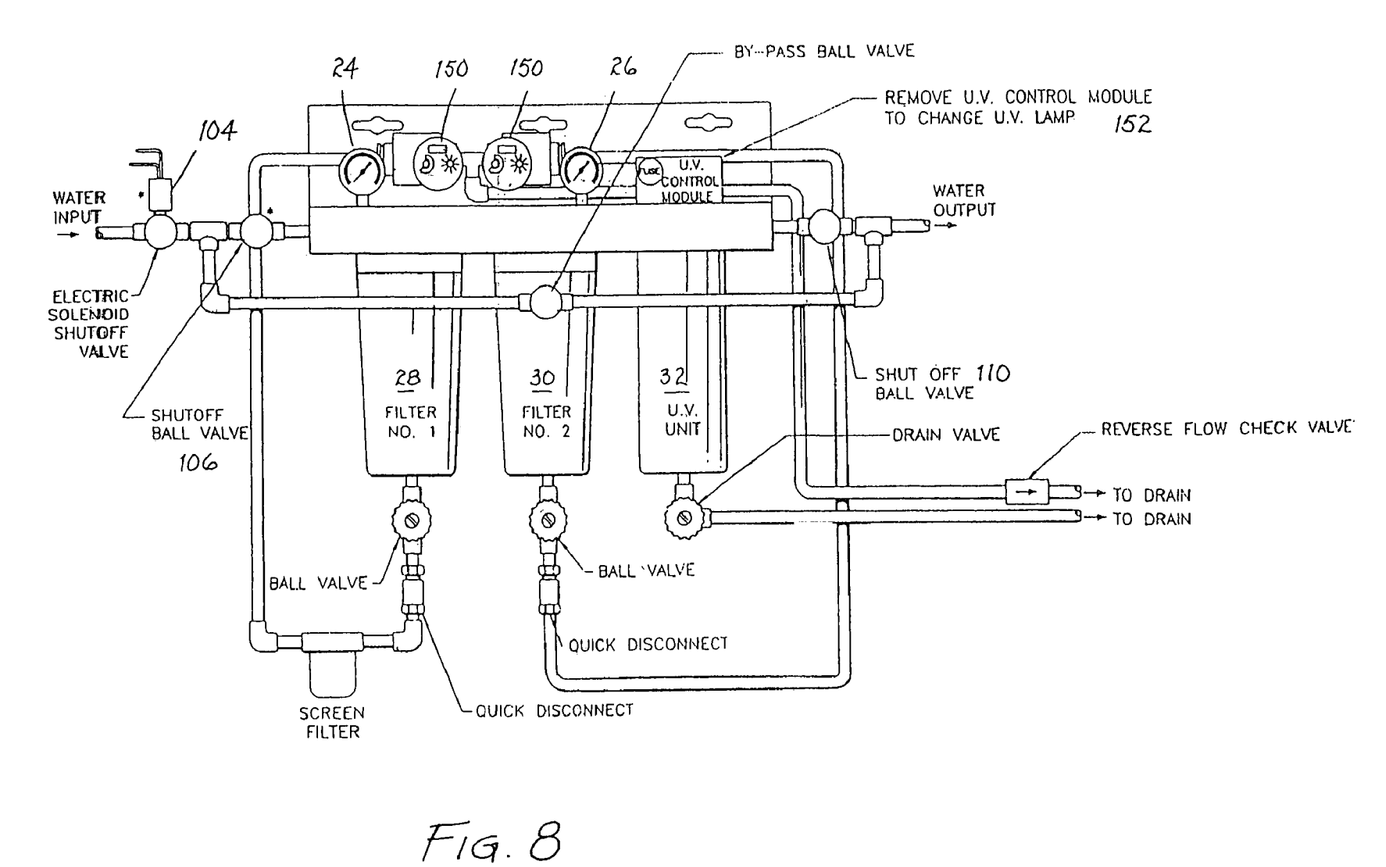
FIG. 8 is a functional block diagram of the filtration and purification system depicted in FIG. 7.

Referring now to FIGS. 7 and 8, another embodiment of the filtration and purification system 10 is shown. In this embodiment, the filtration and purification system 10 is similar to that shown and described above. The main difference is that the timer and control unit 12 has been replaced. Instead, a programmable timer 150 is coupled to both the coarse filter assembly 28 and the fine filter assembly 30. The programmable timer 150 will allow individuals to set when the coarse filter assembly 28 and the fine filter assembly 30 will be flushed. The programmable timer 150 is unique in that the programmable timer 150 is battery operated. The programmable timer 150 is programmed much in the same way as described above and known to those skilled in the art. The programmable timer 150 will have one or more dials/buttons/switches to set when and how often the coarse filter assembly 28 and the fine filter assembly 30 will be flushed. Since the timer and control unit 12 is removed, the ultraviolet lamp operation indicator 74 and the ultraviolet power ballast B1 are placed in a ultraviolet control box 152.

Figure 9:
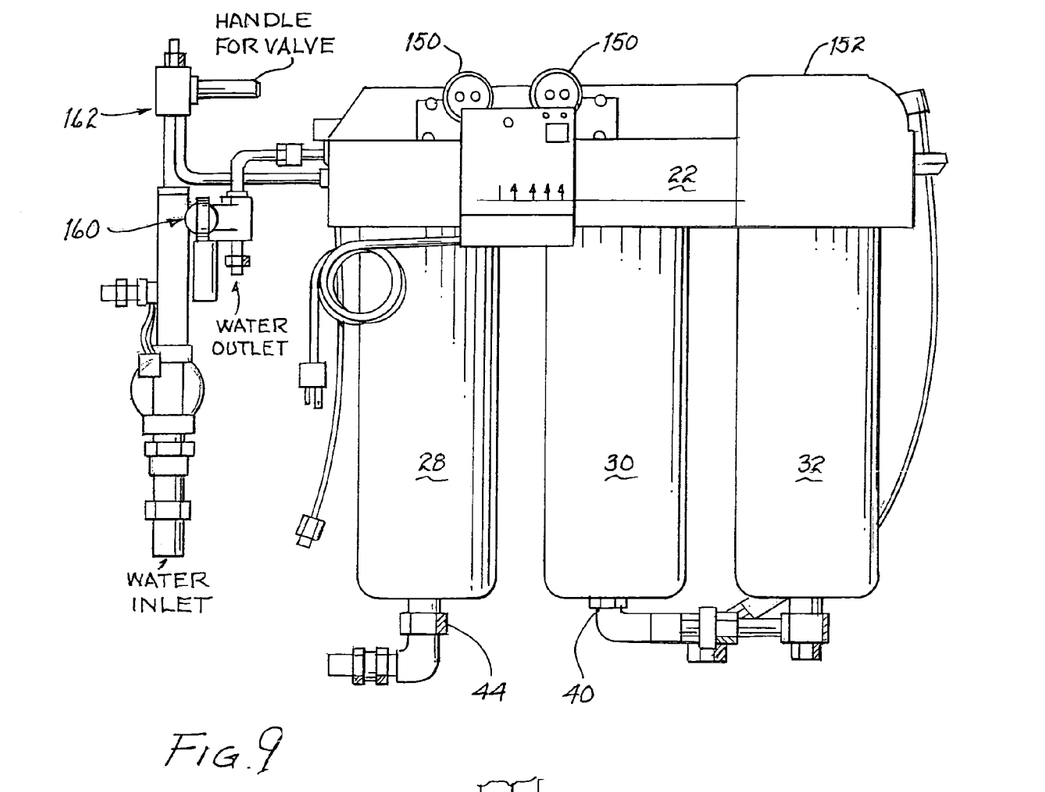
FIG. 9 is an elevated perspective view of another embodiment of the filtration and purification system of the present invention.
Figure 10:
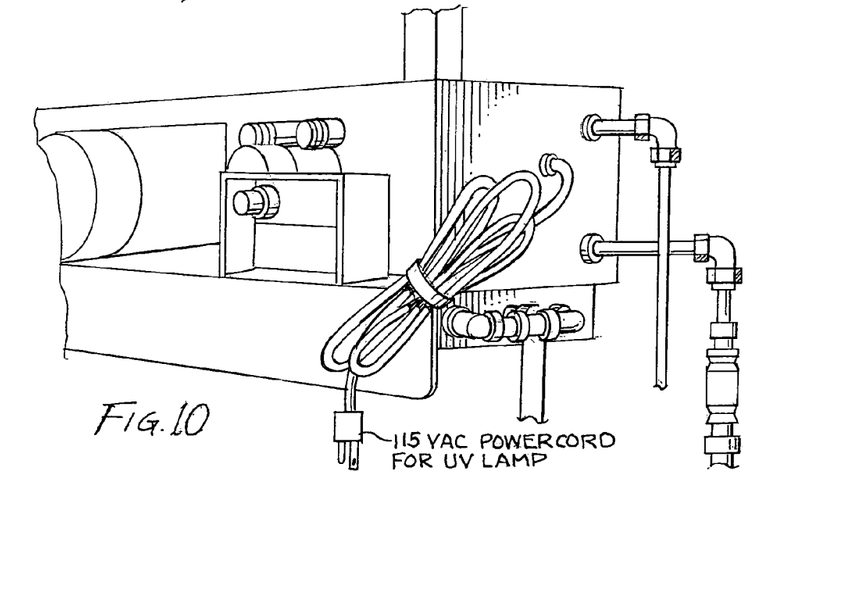
FIG. 10 is a side view of the embodiment depicted in FIG. 9.

Referring to FIGS. 9 and 10, another embodiment of the filtration and purification system 10 is shown. In this embodiment, the filtration and purification system 10 is similar to that shown and described above in FIGS. 7 and 8. The main difference is that a bypass valve 160 is coupled to the filtration and purification system 10. The bypass valve 160 satisfies certain regulations requiring the use of a bypass valve 160 in medical offices. The bypass valve 160 allows one to direct the flow of water either through the filtration and purification system 10 or to bypass the filtration and purification system 10 all together. The bypass valve 160 is a singe valve bypass. A manual valve or a computer actuated valve may be used.

The bypass valve 160 has an input which is coupled to a water line. The output of the bypass valve 160 depends on wether the bypass valve 160 is in an open or closed position. In a first position, water is diverted through the bypass valve 160 to the filtration and purification system 10. In a second position, water runs through the bypass valve 160 and out a water outlet. The water completely bypasses the filtration and purification system 10. The bypass valve 160 has an air bleed valve 162 coupled thereto. The air bleed valve 162 allows one to release air that may be in the water line.

In operation, water will enter the filtration and purification system 10 at the water input 162. If the bypass valve 160 is in position one, water will continuously flow through the filtration and purification system 10. Water will flow through the filter head 22 to the coarse filter assembly 28. After the water flows through the course filter assembly 28, the water will flow through a fine filter assembly 30 connected to the filter head 22. The water will next flow through a purification assembly 32. The purification assembly 32 may be comprised of different types of filtering media. In accordance with one embodiment of the present invention, the purification assembly 32 comprises an internal high energy 25-watt ultraviolet lamp. In general, the high energy 25-watt ultraviolet lamp should have an output of approximately 60,000 Micro watts/square-centimeter (at EOL), and an approximate lifetime of 9,000 hours. Such filter media and ultraviolet lamps are of types generally commercially available.

The coarse and fine filter assemblies 28 and 30 and the purification assembly 32 are mechanically coupled such that a flow of incoming water passes through the assemblies in a series flow, as will be well understood by those skilled in the art. Water will then flow out of the water outlet 164 to some fixture attached thereto. If the bypass valve 160 is in position two, water will flow directly out of the water outlet 164.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An automatic water filtration and purification system for light industrial and home installations, having continuous water flow to a fixture coupled thereto, while simultaneously and automatically regularly flushing and cleaning in-path filter media, comprising, in combination:
   a course filter assembly coupled to the bypass valve;
   a fine filter assembly coupled in series to the course filter assembly;
   an ultraviolet lamp assembly coupled series with the fine filter assembly;
   a respective flushing control valve coupled to a flushing port located on each of the course filter assembly and the fine filter assembly;
   a bypass valve coupled to a water line for diverting water to the fixture without passing through the course and fine filter assemblies; and
   a programmable control unit connected to the flushing control valves wherein the programmable control unit comprises a sequentially energized flushing control valve timer electrically connected to the flushing control valves for automatically and regularly flushing and cleaning the course and fine filter assemblies.

2. The automatic water filtration and purification system in accordance with claim 1 further comprising a valve filter coupled downstream of at least one of the flushing control valves.

3. The automatic water filtration and purification system in accordance with claim 2 further comprising an air bleed valve coupled to the bypass valve to remove air from the automatic water filtration and purification system.

* * * * *